UNITED STATES PATENT OFFICE.

CHARLES ALBERT SHULTZ, OF PORTLAND, OREGON.

COMPOSITION OF MATTER TO BE USED AS A COATING FOR GRINDING-SURFACES.

1,011,504.     Specification of Letters Patent.     Patented Dec. 12, 1911.

No Drawing.     Application filed December 22, 1910. Serial No. 598,852.

*To all whom it may concern:*

Be it known that I, CHARLES ALBERT SHULTZ, a citizen of the United States, and a resident of Portland, Multnomah county, State of Oregon, have invented a new and useful Improvement in Composition of Matter to be Used as a Coating for Grinding-Surfaces, of which the following is a specification.

My invention relates to the process of cleaning wheat. This work is now generally performed, as well known, by means of a machine comprising a case in which revolves a cylinder, the opposed faces of which casing and cylinder are covered with some suitable material providing a more or less roughened or abrading surface, so that in the rotation of the cylinder foreign matter will be removed from the wheat berry. It has been the custom to use a mineral composition as a covering or surface for the walls of the casing or the cylinder, or both.

My invention particularly relates to such mineral surfacing, and has for its object to produce a compound which will set as hard as steel, will not wear away in places, so as to produce cavities, but to the contrary will wear even, continuously; a compound, furthermore, which will not become glazed, but maintain its effective working condition without change. To this end I use a compound formed of the following ingredients and in the proportions stated, to wit:

> Ground carborundum ___ 4 pounds.
> Ground emery cement ___ ½ pound.
> Portland cement _____ ½ pound.
> Muratic acid _____ 4 ounces.
> Rock salt brine _____ 1 pound.
> Emery flour _____ 1 pound.

The rock salt brine being of the strength of 1300 degrees Baumé at a temperature of 60 degrees Fahrenheit. All the proportions given are by avoirdupois weight.

To prepare the rock salt brine, I take crushed rock salt and dissolve it in soft distilled water; or, where convenient, I dissolve the rock salt in steam. In either case, the solution obtained must be tested so as to be of the strength given. The ingredients are thoroughly intermingled in a mortar, or other suitable utensil, and the resulting cement is applied to the surface to be coated, so as to produce a layer ⅝ of an inch thick. Prolonged tests by me with a grain cleaning machine, of which the interior wall of the casing was coated by my composition as given, have shown that there is no uneven wearing away of the surface, nor any deterioration in its effective working condition though continuously used for months.

While I have described my composition as specially invented for use as a surfacing material in a grain cleaning machine, I, however, do not wish to be understood as limiting myself to such use, since the same composition is capable of being used as a coating for any grinding surface.

I claim:

1. The herein described composition of matter consisting of ground carborundum, ground emery cement, emery flour, ground Portland cement, muriatic acid, and brine of the strength of 1300 degrees Baumé at 60 degrees Fahrenheit, all proportions given being avoirdupois weight.

2. The herein described composition of matter consisting of ground carborundum four pounds, ground emery cement one-half pound, emery flour one pound, ground Portland cement one-half pound, muriatic acid four ounces, and rock salt brine of the strength of 1300 degrees Baumé at 60 degrees Fahrenheit, all proportions given being avoirdupois weight.

CHARLES ALBERT SHULTZ.

Witnesses:
  CECIL LONG,
  O. O. MARTIN.